(12) United States Patent
Chang

(10) Patent No.: US 9,703,401 B2
(45) Date of Patent: *Jul. 11, 2017

(54) PORTABLE ELECTRONIC DEVICE AND MINIATURIZATION RECHARGEABLE CAPACITIVE STYLUS THEREOF

(71) Applicant: WALTOP INTERNATIONAL CORPORATION, Hsinchu (TW)

(72) Inventor: Yi-Chih Chang, Taipei (TW)

(73) Assignee: WALTOP INTERNATIONAL CORPORATION, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,670

(22) Filed: Dec. 1, 2015

(65) Prior Publication Data

US 2017/0075440 A1    Mar. 16, 2017

(30) Foreign Application Priority Data

Sep. 16, 2015  (TW) .............................. 104214977 U

(51) Int. Cl.
*G06F 3/0354* (2013.01)
(52) U.S. Cl.
CPC ................. *G06F 3/03545* (2013.01)
(58) Field of Classification Search
CPC .................. G06F 3/03545; G06F 3/03546
USPC ................ 345/179; 178/19.01–19.05
See application file for complete search history.

(56) References Cited

U.S. PATENT DOCUMENTS

2014/0015812 A1*  1/2014  Peralta ................ G06F 3/03545
                                                     345/179
2015/0091844 A1*  4/2015  Ho ........................ G06F 3/044
                                                     345/174

* cited by examiner

Primary Examiner — Amare Mengistu
Assistant Examiner — Stacy Khoo
(74) Attorney, Agent, or Firm — Li & Cai Intellectual Property (USA) Office

(57) ABSTRACT

A portable electronic device uses a miniaturization rechargeable capacitive stylus including a pen-shaped metal casing structure, a support structure, a circuit substrate, a sensor module, a pen head structure, an electrical connector structure, and a power supply component. The pen-shaped metal casing structure has a retaining convex portion. The electrical connector structure includes a carrier substrate positioned on the support structure and an electrical connector disposed on the carrier substrate, and the electrical connector has an electrical connection portion exposed from the pen-shaped metal casing structure. When the pen-shaped metal casing structure is inserted into a receiving space of the portable electronic device, the pen-shaped metal casing structure is positioned inside the receiving space of the portable electronic device by matching the retaining convex portion of the pen-shaped metal casing structure and a retaining concave portion that is disposed inside the receiving space of the portable electronic device.

10 Claims, 10 Drawing Sheets

PORTABLE ELECTRONIC DEVICE AND MINIATURIZATION RECHARGEABLE CAPACITIVE STYLUS THEREOF

BACKGROUND OF THE INVENTION

1. Field of the Invention

The instant disclosure relates to an electronic device and a capacitive stylus thereof, and more particularly to a portable electronic device and a miniaturization rechargeable capacitive stylus thereof.

2. Description of Related Art

Conventional touch control devices may be classified into three types: resistive, electromagnetic and capacitive. Operation with a resistive touch control device requires a rigid pen tip to apply a significant force on the resistive touch control device in a very small area to accomplish deformation of the resistive touch sensor, and an electromagnetic touch control device requires a special battery powered pen for input; while the working principle of a capacitive touch control device relies on capacitive coupling, which takes place as soon as the capacitive touch sensor is touched by a conductive object, and the touch position can then be identified according to the variation in capacitance at the touch point. Therefore, a capacitive touch control device does not require an input pen that consumes electricity. Nor is it necessary to subject a capacitive touch sensor to concentrated pressure application for deformation, and thus a capacitive touch control device has a longer service life. Furthermore, mass production of capacitive touch control devices requires lower costs due to its simple construction, less components and higher yield rate.

A capacitive touch control device can be operated in many ways. The most common of all is using a conductor, for example a finger or a pen, to touch or slide on the surface of the capacitive touch control device, for the capacitive touch sensor thereof to generate a response signal. However, as capacitive touch control devices find more and more applications, the lower precision on position detection tends to hinder smoothness of operation where more precise and more efficient detection is required, such as in handheld devices. In order to enable enhanced precision on position detection, many people choose to use pens for capacitive touch input.

SUMMARY OF THE INVENTION

One aspect of the instant disclosure relates to a portable electronic device and a miniaturization rechargeable capacitive stylus thereof.

One of the embodiments of the instant disclosure provides a miniaturization rechargeable capacitive stylus, comprising: a pen-shaped metal casing structure, a support structure, a circuit substrate, a sensor module, a pen head structure, an electrical connector structure, and a power supply component. The pen-shaped metal casing structure has a retaining convex portion disposed on a top side thereof. The support structure is disposed inside the pen-shaped metal casing structure. The circuit substrate is positioned on the support structure and disposed inside the pen-shaped metal casing structure. The sensor module is positioned on the support structure and disposed inside the pen-shaped metal casing structure, and the sensor module is electrically connected to the circuit substrate. The pen head structure is movably disposed on the support structure to selectively contact the sensor module, and the pen head structure has an exposed contact portion exposed from the pen-shaped metal casing structure. The electrical connector structure is positioned on the support structure and disposed inside the pen-shaped metal casing structure. The electrical connector structure includes a carrier substrate positioned on the support structure and an electrical connector disposed on the carrier substrate and electrically connected to the carrier substrate, and the electrical connector has an electrical connection portion exposed from the pen-shaped metal casing structure. The power supply component is disposed on the support structure and electrically connected between the circuit substrate and electrical connector structure.

More particularly, the support structure includes a main support element for supporting the circuit substrate, the sensor module, the pen head structure, the power supply component, and the electrical connector structure, and the main support element includes a first support body and a second support body mated with the first support body.

More particularly, the first support body has a plurality of first retaining structures, the second support body has a plurality of second retaining structures respectively corresponding to the first retaining structures, and the second retaining structures are respectively mated with the first retaining structures for positioning the second support body on the first support body.

More particularly, the carrier substrate has a plurality of first positioning grooves, the circuit substrate has a plurality of second positioning grooves and a plurality of third positioning grooves, the first support body has a plurality of first positioning protrusion portions respectively positioned in the first positioning grooves and a plurality of second positioning protrusion portions respectively positioned in the second positioning grooves, and the second support body has a plurality of third positioning protrusion portions respectively positioned in the third positioning grooves, wherein the pen-shaped metal casing structure has a top positioning groove and a bottom positioning groove correspondingly disposed on an end side thereof, the first support body has a bottom positioning protrusion portion positioned in the bottom positioning groove and exposed from the bottom positioning groove, and the second support body has a top positioning protrusion portion positioned in the top positioning groove and exposed from the top positioning groove.

More particularly, the miniaturization rechargeable capacitive stylus further comprises an elastic component including an elastic winding portion disposed around a pen core seat of the pen head structure and a conductive connection portion extended from the elastic winding portion to the circuit substrate, wherein the elastic winding portion has a first end far away from the sensor module and a second end opposite to the first end and adjacent to the sensor module, the first end of the elastic winding portion is abutted against a position limiting portion of the pen head structure, and the conductive connection portion is electrically connected between the second end of the elastic winding portion and the circuit substrate.

More particularly, the miniaturization rechargeable capacitive stylus further comprises a ground component having a fixed portion disposed on the circuit substrate and electrically contacting the circuit substrate and a movable elastic portion extended from the fixed portion, wherein the movable elastic portion has an abutting portion exposed from the support structure to abut against an inner surface of the pen-shaped metal casing structure and a suspend portion extended from the abutting portion and inserted into or passing through the circuit substrate.

More particularly, the miniaturization rechargeable capacitive stylus further comprises a LED indicator lamp disposed on the carrier substrate and electrically connected to the carrier substrate, the pen-shaped structure has a light-transmitting cover body adjacent to the LED indicator lamp, and an indicator light source generated by the LED indicator lamp passes through the light-transmitting cover body, wherein the electrical connector includes two single needle spring connectors, each single needle spring connector includes a fixed casing fixed on the carrier substrate, a compression spring disposed inside the fixed casing, and a movable element abutting against the compression spring, one part of the movable element is disposed inside the fixed casing to abut against the compression spring, and the other part of the movable element is exposed from the pen-shaped metal casing structure, wherein the pen-shaped metal casing structure has two passing holes and two insulation rings respectively positioned in the passing holes, and the two movable elements of the two single needle spring connectors are respectively separated from the two insulation rings and respectively pass through the two insulation rings.

Another one of the embodiments of the instant disclosure provides a portable electronic device using a miniaturization rechargeable capacitive stylus. The miniaturization rechargeable capacitive stylus comprises a pen-shaped metal casing structure, a support structure, a circuit substrate, a sensor module, a pen head structure, an electrical connector structure, and a power supply component. The pen-shaped metal casing structure has a retaining convex portion disposed on a top side thereof. The support structure is disposed inside the pen-shaped metal casing structure. The circuit substrate is positioned on the support structure and disposed inside the pen-shaped metal casing structure. The sensor module is positioned on the support structure and disposed inside the pen-shaped metal casing structure, and the sensor module is electrically connected to the circuit substrate. The pen head structure is movably disposed on the support structure to selectively contact the sensor module, and the pen head structure has an exposed contact portion exposed from the pen-shaped metal casing structure. The electrical connector structure is positioned on the support structure and disposed inside the pen-shaped metal casing structure. The electrical connector structure includes a carrier substrate positioned on the support structure and an electrical connector disposed on the carrier substrate and electrically connected to the carrier substrate, and the electrical connector has an electrical connection portion exposed from the pen-shaped metal casing structure. The power supply component is disposed on the support structure and electrically connected between the circuit substrate and electrical connector structure.

Therefore, when the pen-shaped metal casing structure (or the miniaturization rechargeable capacitive stylus) is inserted into a receiving space of the portable electronic device, the pen-shaped metal casing structure (or the miniaturization rechargeable capacitive stylus) is positioned inside the receiving space of the portable electronic device by matching the retaining convex portion of the pen-shaped metal casing structure and a retaining concave portion that is disposed inside the receiving space of the portable electronic device.

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Figure 1:
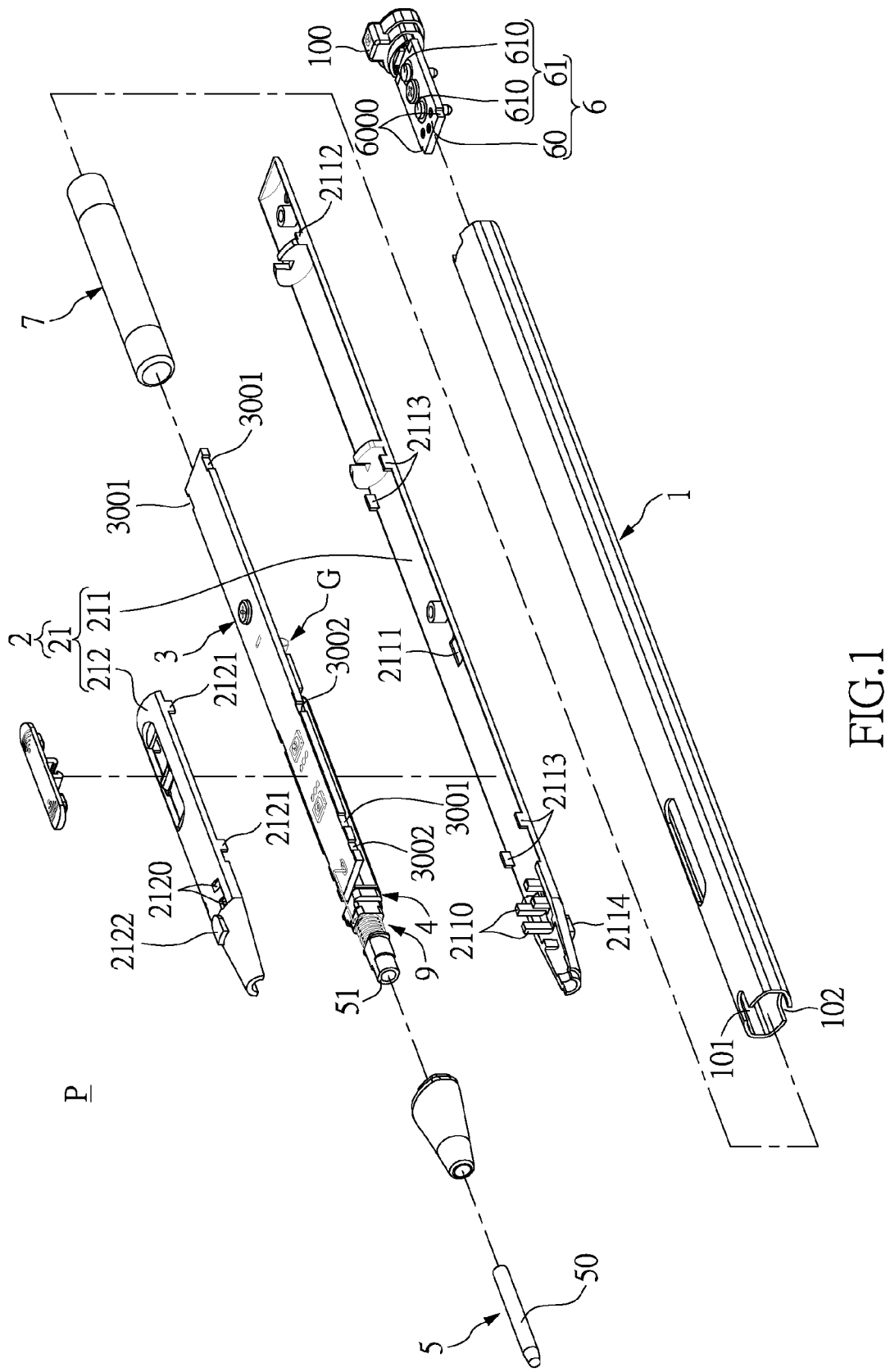
FIG. 1 shows a partial, perspective, exploded, schematic view of the miniaturization rechargeable capacitive stylus according to the instant disclosure.

The embodiments of "a portable electronic device and a miniaturization rechargeable capacitive stylus (touch pen) thereof" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Referring to FIG. 1 to FIG. 10, the instant disclosure provides a miniaturization rechargeable capacitive stylus P and a portable electronic device Z using the miniaturization rechargeable capacitive stylus P, and the miniaturization rechargeable capacitive stylus P includes a pen-shaped metal casing structure 1, a support structure 2, a circuit substrate 3, a sensor module 4, a pen head structure 5, an electrical connector structure 6, and a power supply component 7.

Figure 4:
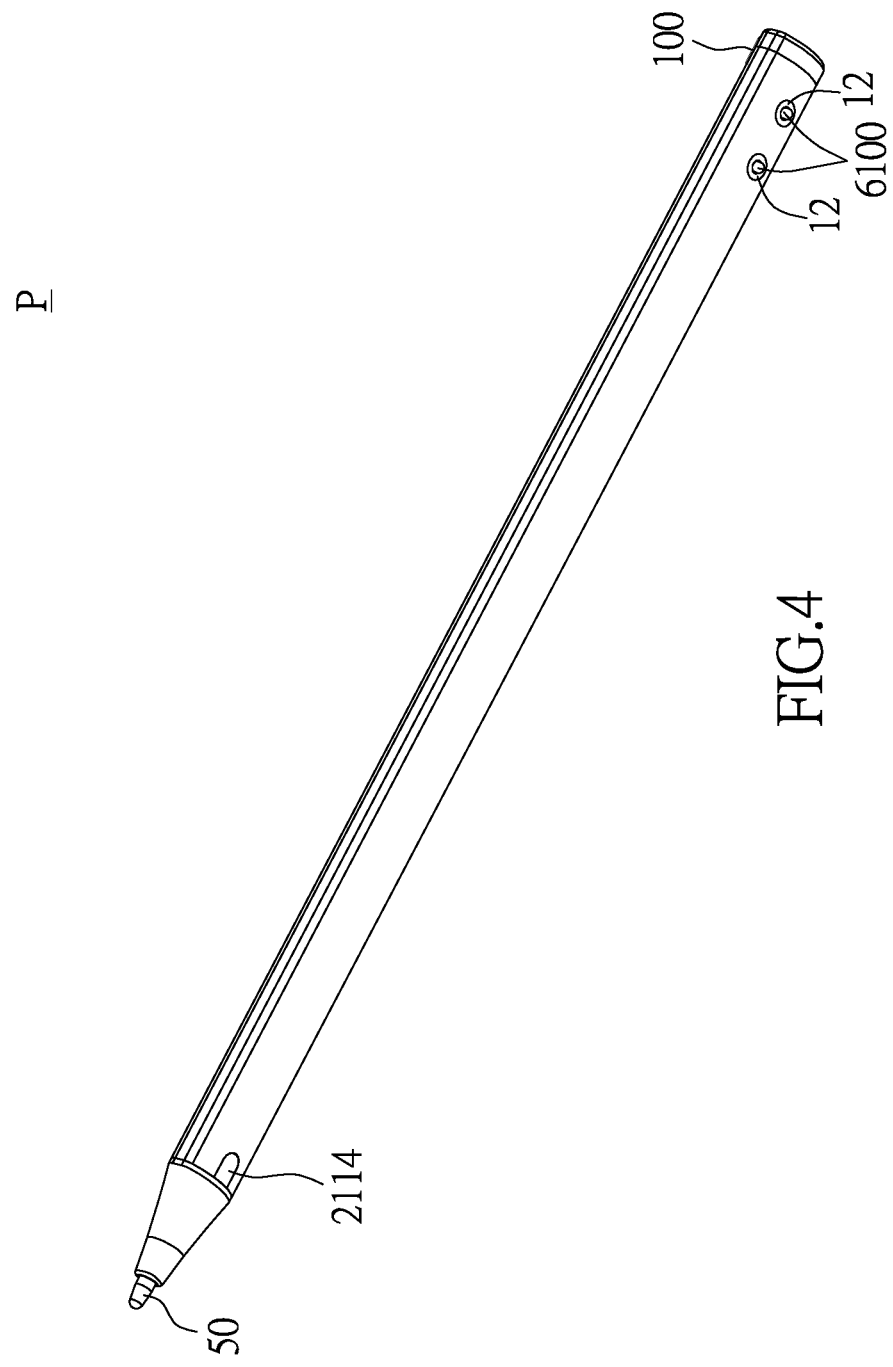
FIG. 4 shows a perspective, assembled, schematic view of the miniaturization rechargeable capacitive stylus according to the instant disclosure.
Figure 10:
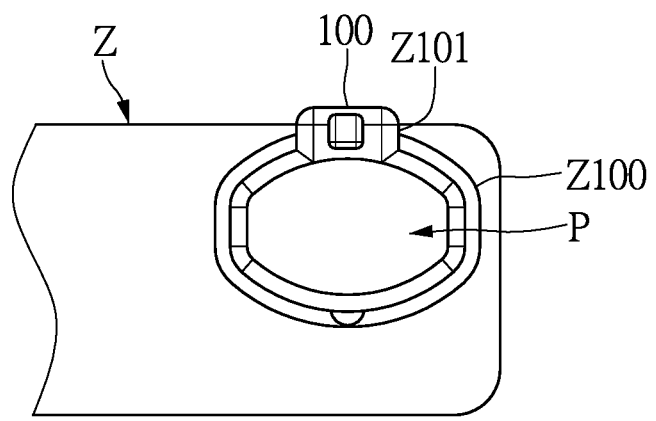
FIG. 10 shows a partial, top, schematic view of the portable electronic device using the miniaturization rechargeable capacitive stylus according to the instant disclosure.

First, referring to FIG. 1, FIG. 4, and FIG. 10, the pen-shaped metal casing structure 1 has a retaining convex portion 100 disposed on a top side thereof. For example, the pen-shaped metal casing structure 1 has a main pen body made of any metal material, such as copper, aluminum, or stainless steel etc. More particularly, referring to FIG. 4 and FIG. 10, when the pen-shaped metal casing structure 1 (or the miniaturization rechargeable capacitive stylus P) is inserted into a receiving space Z100 of a portable electronic device Z (such as a smart phone or a tablet computer), the pen-shaped metal casing structure 1 (or the miniaturization rechargeable capacitive stylus P) is positioned inside the receiving space Z100 of the portable electronic device Z by matching the retaining convex portion 100 of the pen-shaped metal casing structure 1 and a retaining concave portion Z101 that is disposed inside the receiving space Z100 of the portable electronic device Z.

Figure 2:
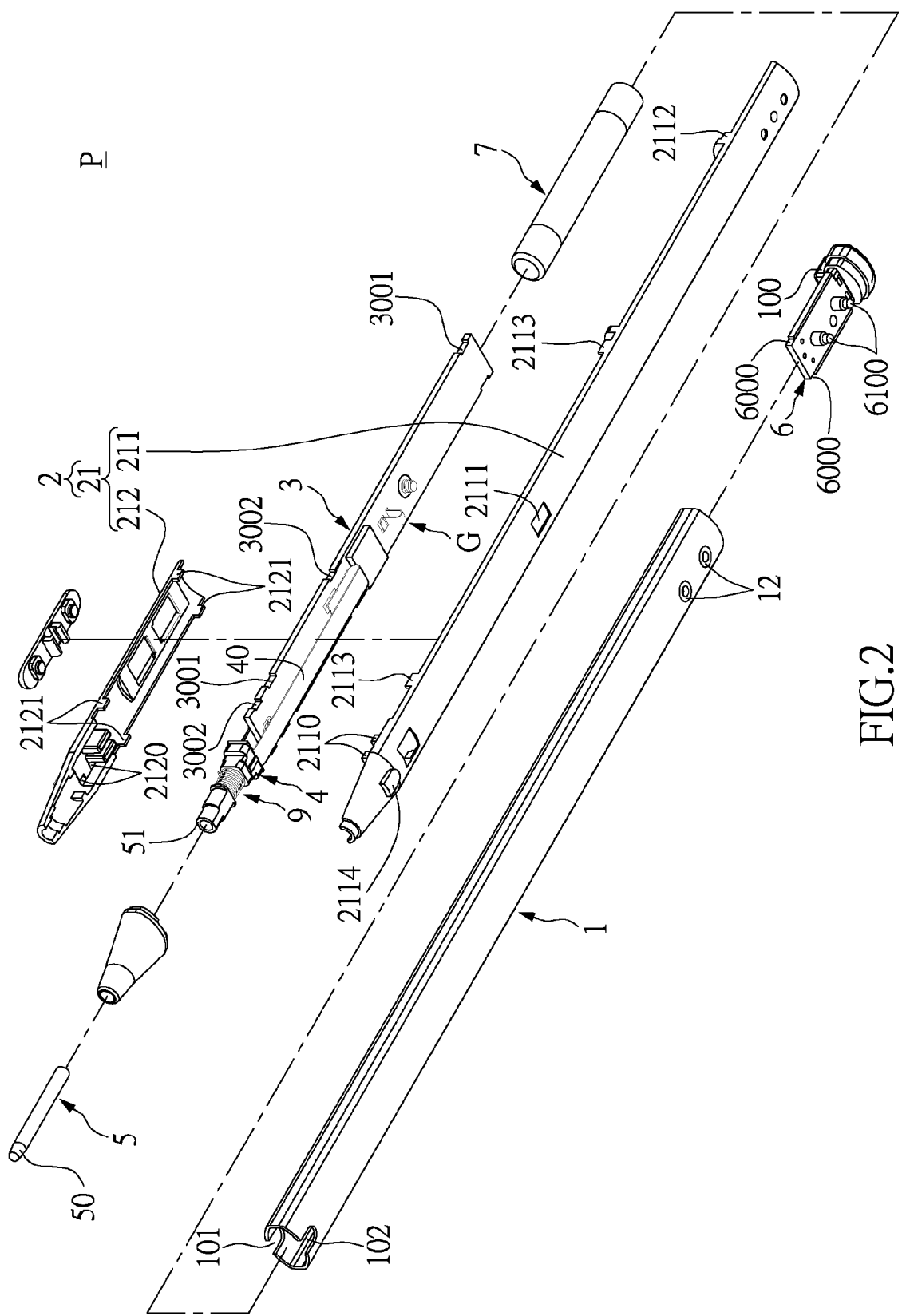
FIG. 2 shows another partial, perspective, exploded, schematic view of the miniaturization rechargeable capacitive stylus according to the instant disclosure.
Figure 3:
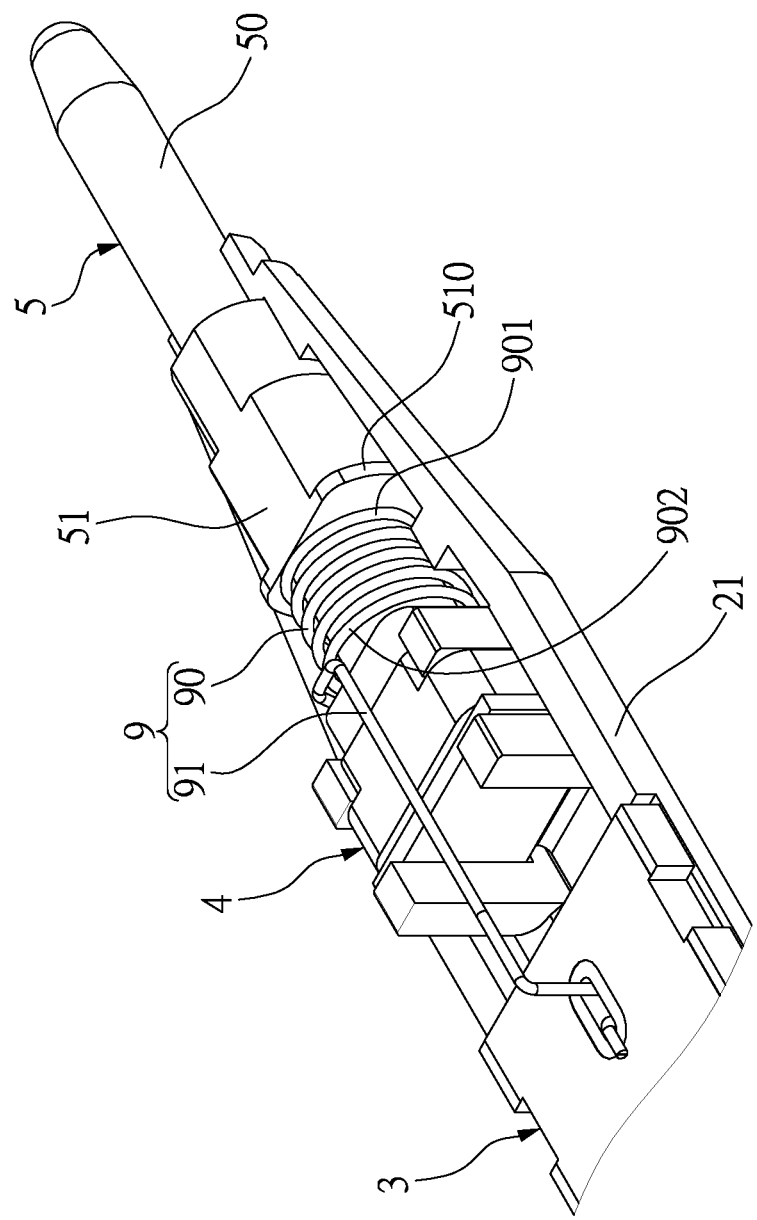
FIG. 3 shows a partial, perspective, assembled, schematic view of the miniaturization rechargeable capacitive stylus according to the instant disclosure.
Figure 8:
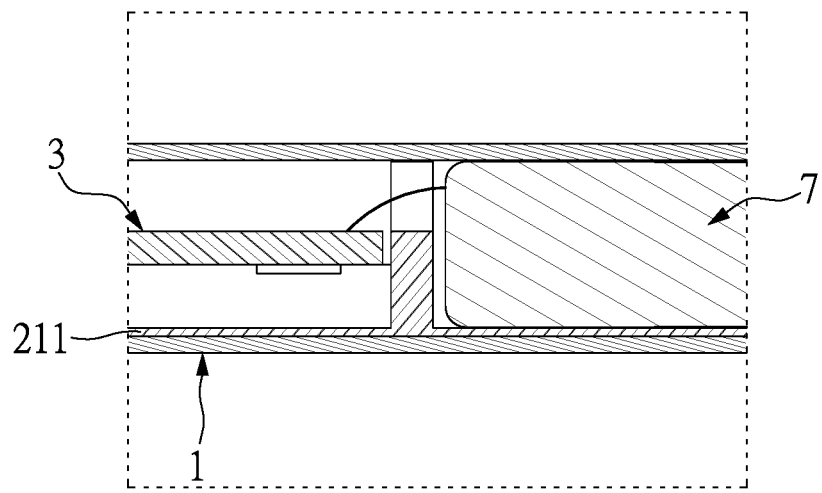
FIG. 8 shows an enlarged view taken on part C of FIG. 5.

Moreover, FIG. 1, FIG. 2, and FIG. 8, the support structure 2 is disposed inside the pen-shaped metal casing structure 1. More particularly, the support structure 2 includes a main support element 21 for supporting the circuit substrate 3, the sensor module 4, the pen head structure 5, the power supply component 7, and the electrical connector structure 6, and the main support element 21 includes a first support body 211 (or called as a bottom lateral holder) and a second support body 212 (or called as a top lateral holder) mated with the first support body 211, and the length of the first support body 211 is longer than the length of the second support body 212 for concurrently supporting all of the circuit substrate 3, the power supply component 7, and the electrical connector structure 6. In addition, the first support body 211 has a plurality of first retaining structures 2110 (such as retaining elements), the second support body 212 has a plurality of second retaining structures 2120 (such as retaining grooves) respectively corresponding to the first retaining structures 2110, and the second retaining structures 2120 are respectively mated with the first retaining structures 2110 for positioning the second support body 212 on the first support body 211.

Following the above description, the carrier substrate 60 has a plurality of first positioning grooves 6000, and the circuit substrate 3 has a plurality of second positioning grooves 3001 and a plurality of third positioning grooves 3002. The first support body 211 has a plurality of first positioning protrusion portions 2112 respectively positioned in the first positioning grooves 6000 and a plurality of second positioning protrusion portions 2113 respectively positioned in the second positioning grooves 3001, and the second support body 212 has a plurality of third positioning protrusion portions 2121 respectively positioned in the third positioning grooves 3002. Therefore, the carrier substrate 60 and the circuit substrate 3 are accurately positioned on the first support body 211. Furthermore, the pen-shaped metal casing structure 1 has a top positioning groove 101 and a bottom positioning groove 102 correspondingly disposed on an end side thereof. The first support body 211 has a bottom positioning protrusion portion 2114 positioned in the bottom positioning groove 102 and exposed from the bottom positioning groove 102, and the second support body 212 has a top positioning protrusion portion 101 positioned in the top positioning groove 101 and exposed from the top positioning groove 101. Therefore, the first support body 211 and the second support body 212 are accurately positioned on the pen-shaped metal casing structure 1.

Figure 5:
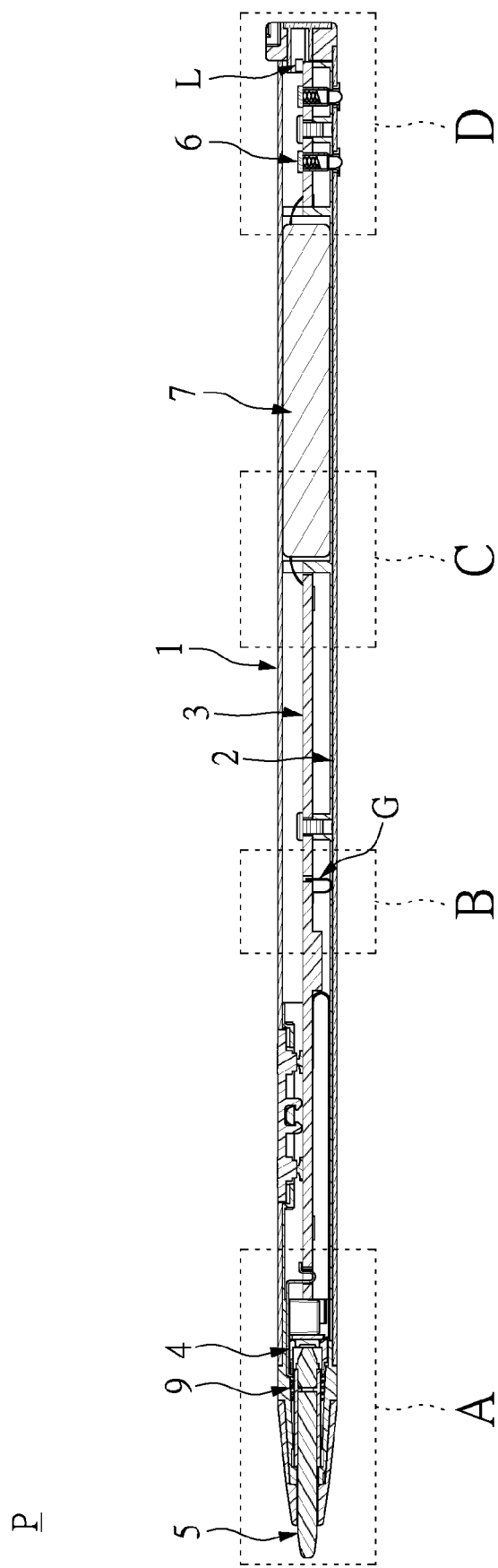
FIG. 5 shows a cross-sectional, schematic view of the miniaturization rechargeable capacitive stylus according to the instant disclosure.
Figure 6:
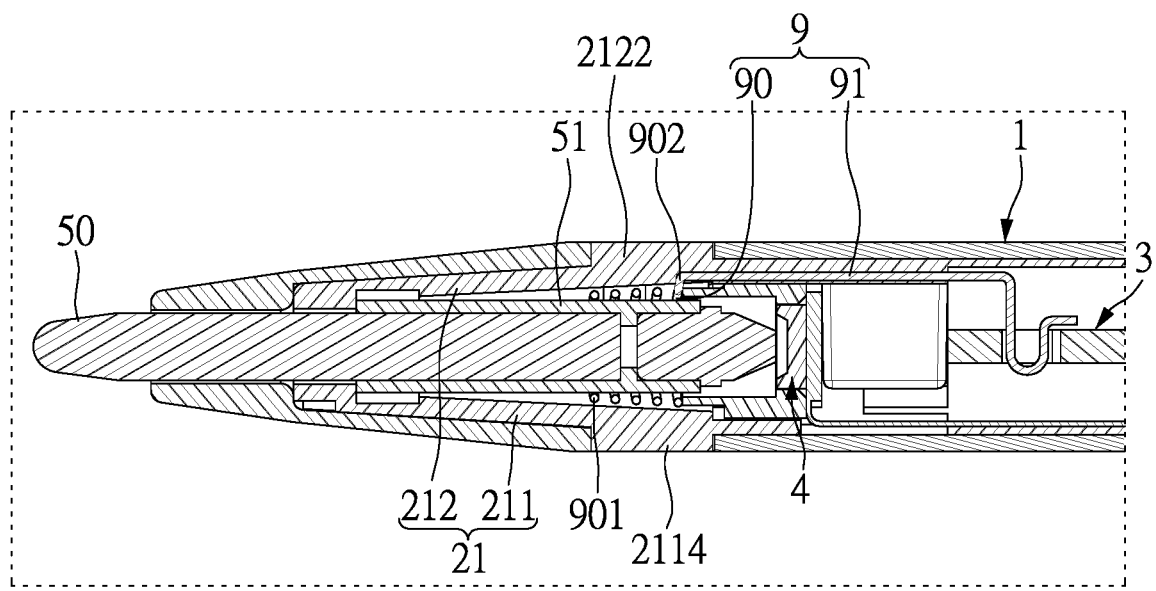
FIG. 6 shows an enlarged view taken on part A of FIG. 5.

Furthermore, FIG. 1, FIG. 2, and FIG. 5, the circuit substrate 3 is positioned on the support structure 2 and disposed inside the pen-shaped metal casing structure 1. The sensor module 4 is positioned on the support structure 2 and disposed inside the pen-shaped metal casing structure 1, and the sensor module 4 is electrically connected to the circuit substrate 3 through a conductive wire 40 (or called as a power transmission line). The pen head structure 5 is movably disposed on the support structure 2 to selectively contact the sensor module 4, and the pen head structure 5 has an exposed contact portion 50 exposed from the pen-shaped metal casing structure 1. More particularly, the sensor module 4 can be used to determine the degree of pressure when a user uses the miniaturization rechargeable capacitive stylus P. The sensor module 4 then shows lines on the handwritten board (not shown). The lines may have different thickness according to the degree of pressure.

In addition, FIG. 1, FIG. 2, FIG. 5, and FIG. 9, the electrical connector structure 6 is positioned on the support structure 2 and disposed inside the pen-shaped metal casing structure 1, and the power supply component 7 (or an electrical storage component such as a rechargeable battery) is disposed on the support structure 2 and electrically connected between the circuit substrate 3 and electrical connector structure 6. More particularly, the electrical connector structure 6 includes a carrier substrate 60 positioned on the main support element 21 of the support structure 2 through many securing elements S (such as screws or bolts) and an electrical connector 61 disposed on the carrier substrate 60 and electrically connected to the carrier substrate 60, and the electrical connector 61 has an electrical connection portion 6100 exposed from the pen-shaped metal casing structure 1. For example, the electrical connector 61 includes two single needle spring connectors 610. Each single needle spring connector 610 includes a fixed casing 610A fixed on the carrier substrate 60, a compression spring 610B disposed inside the fixed casing 610A, and a movable element 610C abutting against the compression spring 610B. One part of the movable element 610C is disposed inside the fixed casing 610A to abut against the compression spring 610B, and the other part of the movable element 610C is exposed from the pen-shaped metal casing structure 1 to form an electrical connection portion 6100.

Figure 9:
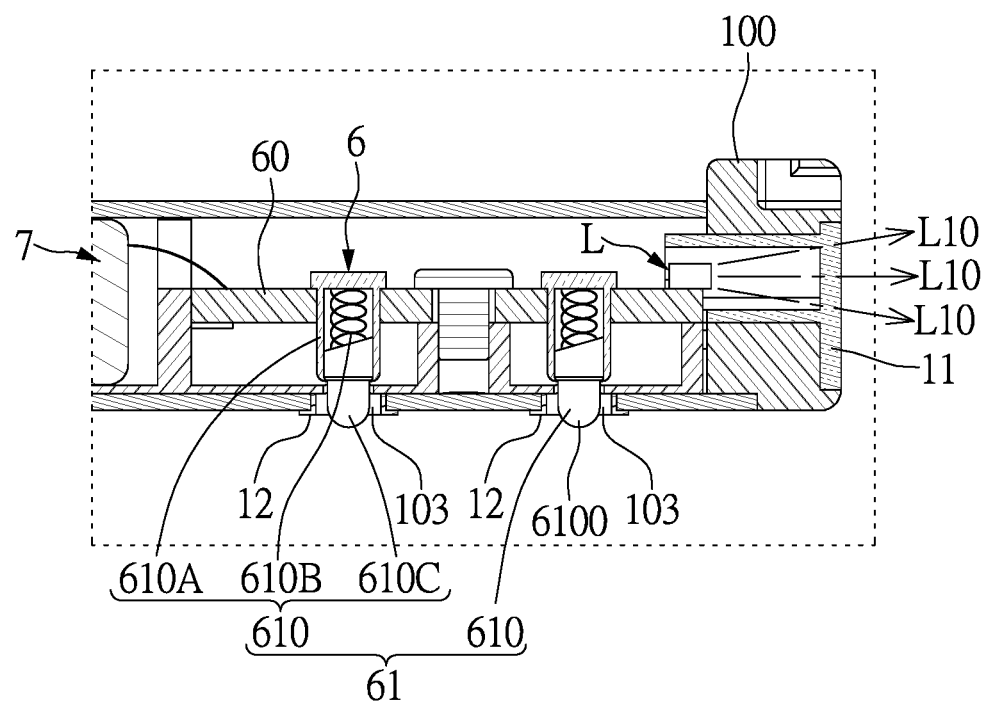
FIG. 9 shows an enlarged view taken on part D of FIG. 5.

More particularly, FIG. 4, FIG. 5, and FIG. 9, the pen-shaped metal casing structure 1 has two passing holes 103 and two insulation rings 12 respectively positioned in the passing holes 103, and the two movable elements 610C of the two single needle spring connectors 610 are respectively separated from the two insulation rings 12, and the two movable elements 610C of the two single needle spring connectors 610 respectively pass through the two insulation rings 12. Therefore, the two insulation rings 12 can be used to prevent the pen-shaped metal casing structure 1 from being touched by the two movable elements 610C.

More particularly, FIG. 1, FIG. 2, FIG. 3, and FIG. 6, the miniaturization rechargeable capacitive stylus P of the instant disclosure further comprises an elastic component 9 (or called as a signal transmitting component). The elastic component 9 includes an elastic winding portion 90 disposed around a pen core seat 51 of the pen head structure 5 and a conductive connection portion 91 extended from the elastic winding portion 90 to the circuit substrate 3. In addition, the elastic winding portion 90 has a first end 901 far away from the sensor module 4 and a second end 902 opposite to the first end 901 and adjacent to the sensor module 4. The first end 901 of the elastic winding portion 90 is abutted against a position limiting portion 510 of the pen head structure 5, and the conductive connection portion 91 is electrically connected between the second end 902 of the elastic winding portion 90 and the circuit substrate 3.

Figure 7:
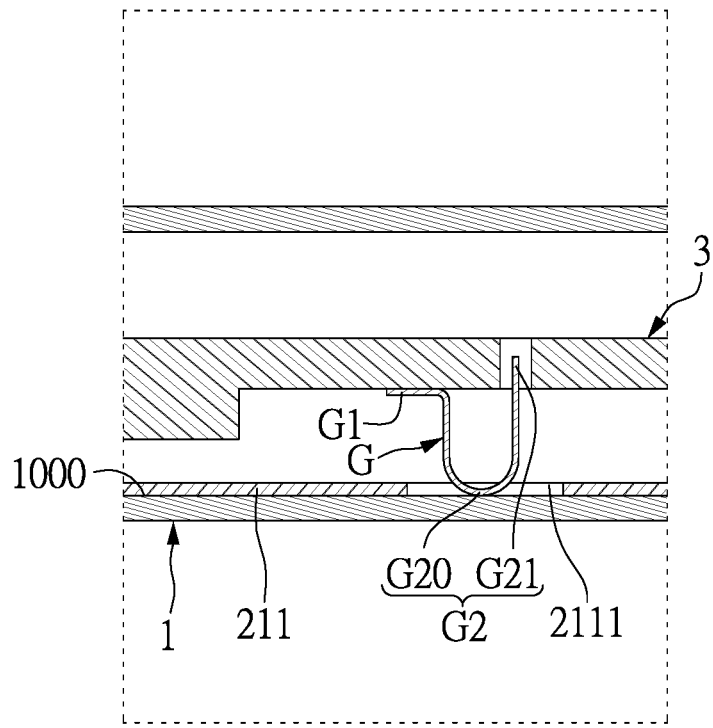
FIG. 7 shows an enlarged view taken on part B of FIG. 5.

More particularly, FIG. 1, FIG. 2, and FIG. 7, the miniaturization rechargeable capacitive stylus P of the instant disclosure further comprises a ground component G. The ground component G has a fixed portion G1 disposed on the circuit substrate 3 and electrically contacting the circuit substrate 3 and a movable elastic portion G2 extended from the fixed portion G1. The movable elastic portion G2 has an abutting portion G20 exposed from a through opening 2111 of the first support body 211 of the support structure 2 to abut against an inner surface 1000 of the pen-shaped metal casing structure 1 and a suspend portion G21 extended from the abutting portion G20 and inserted into or passing through the circuit substrate 3.

More particularly, FIG. 1, FIG. 8, and FIG. 9, the miniaturization rechargeable capacitive stylus P of the instant disclosure further comprises a LED indicator lamp L. The LED indicator lamp L is disposed on the carrier substrate 60 and electrically connected to the carrier substrate 60. The pen-shaped structure 1 has a light-transmitting cover body 11 adjacent to the LED indicator lamp L, and an indicator light source L10 generated by the LED indicator lamp L passes through the light-transmitting cover body 11 for indication.

Figure 11:
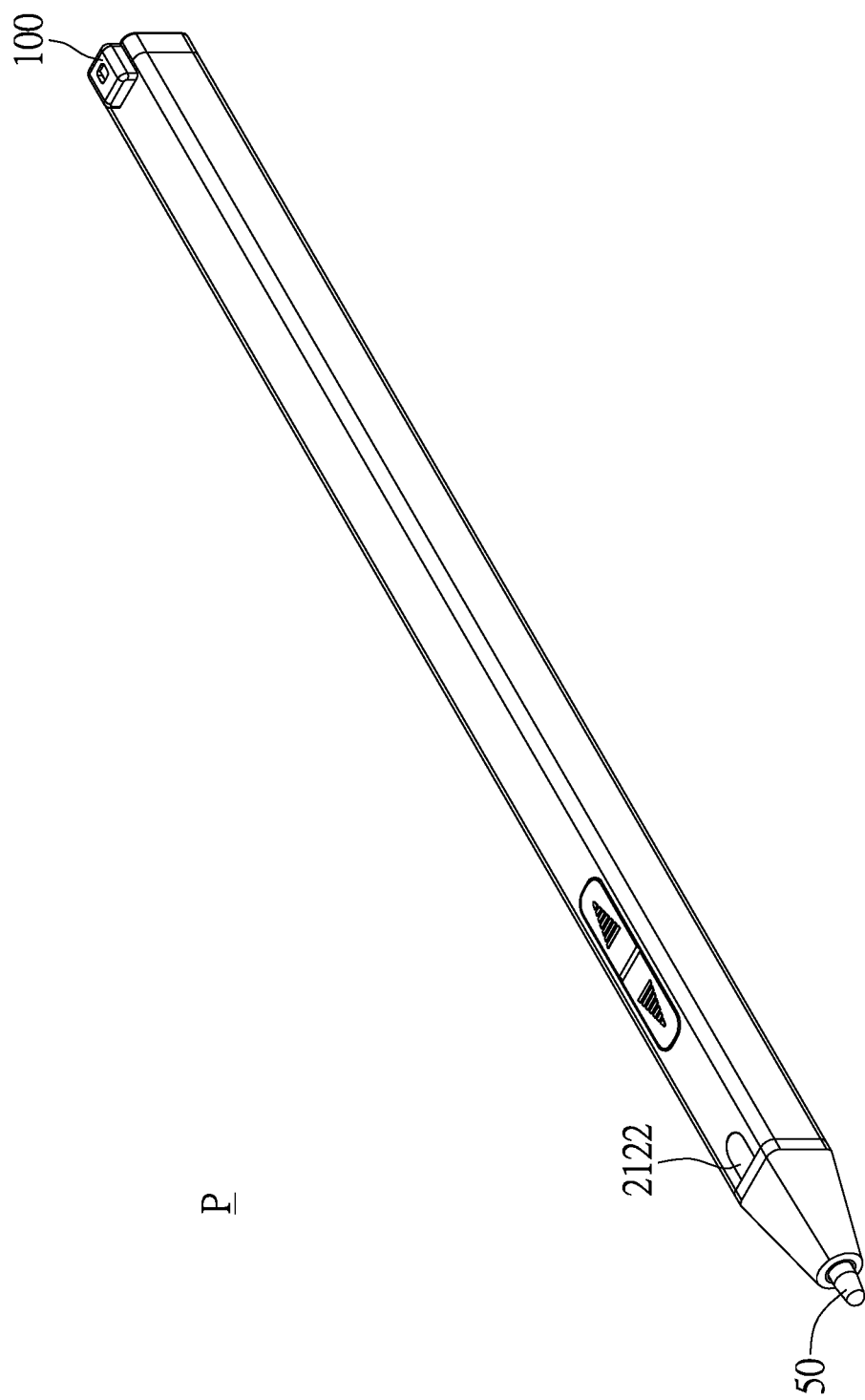
FIG. 11 shows a perspective, assembled, schematic view of the miniaturization rechargeable capacitive stylus according to another embodiment of the instant disclosure.
Figure 12:
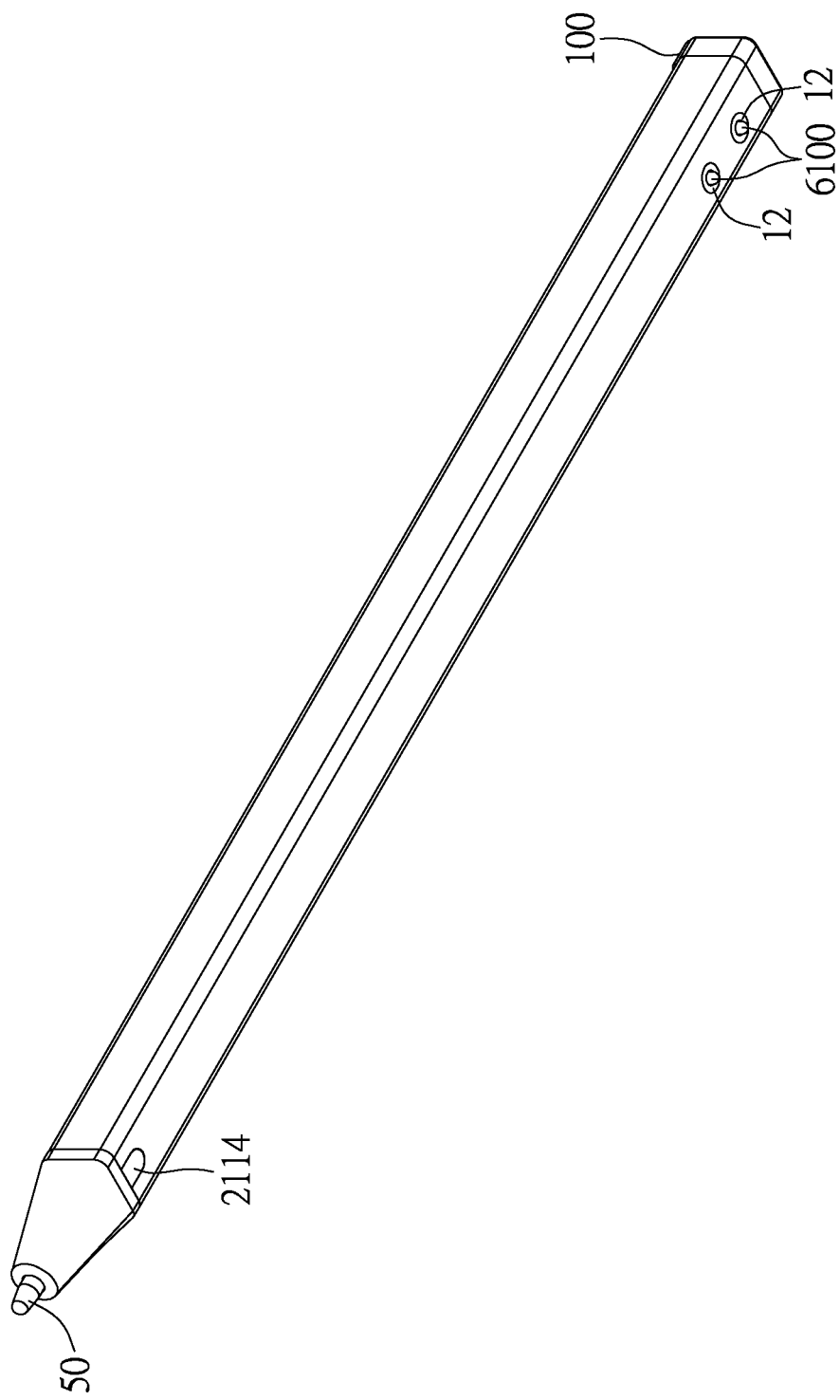
FIG. 12 shows another perspective, assembled, schematic view of the miniaturization rechargeable capacitive stylus according to another embodiment of the instant disclosure.

Please note, the miniaturization rechargeable capacitive stylus P of the instant disclosure can use a circular pen-shaped structure 1 (as shown in FIG. 4) or a square pen-shaped structure 1 (as shown in FIG. 11 and FIG. 12) according to different requirements, so that the shape of the pen-shaped structure 1 in FIG. 4 or FIG. 11 is merely an example and is not meant to limit the instant disclosure.

In conclusion, when the pen-shaped metal casing structure 1 (or the miniaturization rechargeable capacitive stylus P) is inserted into the receiving space Z100 of the portable electronic device Z (such as a smart phone or a tablet computer), the pen-shaped metal casing structure 1 (or the miniaturization rechargeable capacitive stylus P) is positioned inside the receiving space Z100 of the portable electronic device Z by matching the retaining convex portion 100 of the pen-shaped metal casing structure 1 and the retaining concave portion Z101 that is disposed inside the receiving space Z100 of the portable electronic device Z.

Please note, when the miniaturization rechargeable capacitive stylus P is inserted into the receiving space Z100 of the portable electronic device Z, the miniaturization rechargeable capacitive stylus P is electrically connected with the portable electronic device Z through the two single needle spring connectors 610, so that the miniaturization rechargeable capacitive stylus P can be charged through the two single needle spring connectors 610.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A miniaturization rechargeable capacitive stylus, comprising:
   a pen-shaped metal casing structure having a retaining convex portion disposed on a top side thereof;
   a support structure disposed inside the pen-shaped metal casing structure;
   a circuit substrate positioned on the support structure and disposed inside the pen-shaped metal casing structure;
   a sensor module positioned on the support structure and disposed inside the pen-shaped metal casing structure, wherein the sensor module is electrically connected to the circuit substrate;
   a pen head structure movably disposed on the support structure to selectively contact the sensor module, wherein the pen head structure has an exposed contact portion exposed from the pen-shaped metal casing structure;
   an electrical connector structure positioned on the support structure and disposed inside the pen-shaped metal casing structure, wherein the electrical connector structure includes a carrier substrate positioned on the support structure and an electrical connector disposed on the carrier substrate and electrically connected to the carrier substrate, and the electrical connector has an electrical connection portion exposed from the pen-shaped metal casing structure; and
   a power supply component disposed on the support structure and electrically connected between the circuit substrate and electrical connector structure;
   wherein the electrical connector includes two single needle spring connectors, each single needle spring connector includes a fixed casing fixed on the carrier substrate, a compression spring disposed inside the fixed casing, and a movable element abutting against the compression spring, one part of the movable element is disposed inside the fixed casing to abut against the compression spring, and the other part of the movable element is exposed from the pen-shaped metal casing structure.

2. The miniaturization rechargeable capacitive stylus of claim 1, wherein the support structure includes a main support element for supporting the circuit substrate, the sensor module, the pen head structure, the power supply component, and the electrical connector structure, and the main support element includes a first support body and a second support body mated with the first support body.

3. The miniaturization rechargeable capacitive stylus of claim 2, wherein the first support body has a plurality of first retaining structures, the second support body has a plurality of second retaining structures respectively corresponding to the first retaining structures, and the second retaining structures are respectively mated with the first retaining structures for positioning the second support body on the first support body.

4. The miniaturization rechargeable capacitive stylus of claim 2, wherein the carrier substrate has a plurality of first positioning grooves, the circuit substrate has a plurality of second positioning grooves and a plurality of third positioning grooves, the first support body has a plurality of first positioning protrusion portions respectively positioned in the first positioning grooves and a plurality of second positioning protrusion portions respectively positioned in the second positioning grooves, and the second support body has a plurality of third positioning protrusion portions respectively positioned in the third positioning grooves, wherein the pen-shaped metal casing structure has a top positioning groove and a bottom positioning groove correspondingly disposed on an end side thereof, the first support body has a bottom positioning protrusion portion positioned in the bottom positioning groove and exposed from the bottom positioning groove, and the second support body has a top positioning protrusion portion positioned in the top positioning groove and exposed from the top positioning groove.

5. The miniaturization rechargeable capacitive stylus of claim 1, further comprising: an elastic component including an elastic winding portion disposed around a pen core seat of the pen head structure and a conductive connection portion extended from the elastic winding portion to the circuit substrate, wherein the elastic winding portion has a first end far away from the sensor module and a second end opposite to the first end and adjacent to the sensor module, the first end of the elastic winding portion is abutted against a position limiting portion of the pen head structure, and the conductive connection portion is electrically connected between the second end of the elastic winding portion and the circuit substrate.

6. The miniaturization rechargeable capacitive stylus of claim 1, further comprising: a ground component having a fixed portion disposed on the circuit substrate and electrically contacting the circuit substrate and a movable elastic portion extended from the fixed portion, wherein the movable elastic portion has an abutting portion exposed from the support structure to abut against an inner surface of the pen-shaped metal casing structure and a suspend portion extended from the abutting portion and inserted into or passing through the circuit substrate.

7. The miniaturization rechargeable capacitive stylus of claim 1, further comprising: a LED indicator lamp disposed on the carrier substrate and electrically connected to the carrier substrate, the pen-shaped structure has a light-transmitting cover body adjacent to the LED indicator lamp, and an indicator light source generated by the LED indicator lamp passes through the light-transmitting cover body, wherein the pen-shaped metal casing structure has two passing holes and two insulation rings respectively positioned in the passing holes, and two movable elements of the two single needle spring connectors are respectively separated from the two insulation rings and respectively pass through the two insulation rings.

8. A portable electronic device using a miniaturization rechargeable capacitive stylus, the miniaturization rechargeable capacitive stylus comprising:
 a pen-shaped metal casing structure having a retaining convex portion disposed on a top side thereof;
 a support structure disposed inside the pen-shaped metal casing structure;
 a circuit substrate positioned on the support structure and disposed inside the pen-shaped metal casing structure;
 a sensor module positioned on the support structure and disposed inside the pen-shaped metal casing structure, wherein the sensor module is electrically connected to the circuit substrate;
 a pen head structure movably disposed on the support structure to selectively contact the sensor module, wherein the pen head structure has an exposed contact portion exposed from the pen-shaped metal casing structure;
 an electrical connector structure positioned on the support structure and disposed inside the pen-shaped metal casing structure, wherein the electrical connector structure includes a carrier substrate positioned on the support structure and an electrical connector disposed on the carrier substrate and electrically connected to the carrier substrate, and the electrical connector has an electrical connection portion exposed from the pen-shaped metal casing structure; and
 a power supply component disposed on the support structure and electrically connected between the circuit substrate and electrical connector structure;
 wherein the electrical connector includes two single needle spring connectors, each single needle spring connector includes a fixed casing fixed on the carrier substrate, a compression spring disposed inside the fixed casing, and a movable element abutting against the compression spring, one part of the movable element is disposed inside the fixed casing to abut against the compression spring, and the other part of the movable element is exposed from the pen-shaped metal casing structure.

9. The portable electronic device of claim 8, wherein the support structure includes a main support element for supporting the circuit substrate, the sensor module, the pen head structure, the power supply component, and the electrical connector structure, and the main support element includes a first support body and a second support body mated with the first support body, wherein the first support body has a plurality of first retaining structures, the second support body has a plurality of second retaining structures respectively corresponding to the first retaining structures, and the second retaining structures are respectively mated with the first retaining structures for positioning the second support body on the first support body, wherein the carrier substrate has a plurality of first positioning grooves, the circuit substrate has a plurality of second positioning grooves and a plurality of third positioning grooves, the first support body has a plurality of first positioning protrusion portions respectively positioned in the first positioning grooves and a plurality of second positioning protrusion portions respectively positioned in the second positioning grooves, and the second support body has a plurality of third positioning protrusion portions respectively positioned in the third positioning grooves, wherein the pen-shaped metal casing structure has a top positioning groove and a bottom positioning groove correspondingly disposed on an end side thereof, the first support body has a bottom positioning protrusion portion positioned in the bottom positioning groove and exposed from the bottom positioning groove, and the second support body has a top positioning protrusion portion positioned in the top positioning groove and exposed from the top positioning groove, wherein the pen-shaped metal casing structure has two passing holes and two insulation rings respectively positioned in the passing holes, and two movable elements of the two single needle spring connectors are respectively separated from the two insulation rings and respectively pass through the two insulation rings.

10. The portable electronic device of claim 8, further comprising:
 an elastic component including an elastic winding portion disposed around a pen core seat of the pen head structure and a conductive connection portion extended from the elastic winding portion to the circuit substrate, wherein the elastic winding portion has a first end far away from the sensor module and a second end opposite to the first end and adjacent to the sensor module, the first end of the elastic winding portion is abutted against a position limiting portion of the pen head structure, and the conductive connection portion is electrically connected between the second end of the elastic winding portion and the circuit substrate;
 a ground component having a fixed portion disposed on the circuit substrate and electrically contacting the circuit substrate and a movable elastic portion extended from the fixed portion, wherein the movable elastic portion has an abutting portion exposed from the support structure to abut against an inner surface of the pen-shaped metal casing structure and a suspend portion extended from the abutting portion and inserted into or passing through the circuit substrate; and
 a LED indicator lamp disposed on the carrier substrate and electrically connected to the carrier substrate, the pen-shaped structure has a light-transmitting cover body adjacent to the LED indicator lamp, and an indicator light source generated by the LED indicator lamp passes through the light-transmitting cover body.

* * * * *